Nov. 4, 1924.

B. FRANK 1,514,041

AUTOMOBILE STARTING CRANK SAFETY DEVICE

Filed June 6, 1922

INVENTOR.
Benjamin Frank

BY M. C. Frank
ATTORNEY

Patented Nov. 4, 1924.

1,514,041

UNITED STATES PATENT OFFICE.

BENJAMIN FRANK, OF OAKLAND, CALIFORNIA, ASSIGNOR TO SPECIALTY MANUFACTURING AND DISTRIBUTING COMPANY, INC., OF OAKLAND, CALIFORNIA, A CORPORATION OF CALIFORNIA.

AUTOMOBILE STARTING-CRANK SAFETY DEVICE.

Application filed June 6, 1922. Serial No. 566,336.

*To all whom it may concern:*

Be it known that I, BENJAMIN FRANK, a citizen of the United States, residing at Oakland, in the county of Alameda and State of California, have invented a new and useful Automobile Starting-Crank Safety Device, of which the following is a specification.

This invention relates in general to safety devices, and in particular to a safety device for use in conjunction with automobile starting-cranks, the latter being the crank carried by the car.

The chief object of the invention is to prevent injury to the operator from "backfiring", when cranking his automobile to rotate the motor in order to start it.

In carrying out the invention I provide a ring with means for attaching it to an automobile. This ring encircles the crank stem, and is provided with a series of spring fingers which project in an axial direction from its circumferential surface. These spring fingers are adapted to be engaged by the arm of the crank, and will easily yield to the crank in the direction of cranking, but when the crank moves in the reverse direction, the fingers present to it unyielding inclined surfaces which force the crank outward and free of its engagement with the crank-shaft. Hence, any back-fire causing the crank-shaft to reverse, immediately throws the starting crank free and renders it innocuous.

Other objects and features of construction, will appear in the subjoined description of the accompanying sheet of drawings, illustrating my invention as more particularly adapted for application to a Ford automobile.

Figure 1:
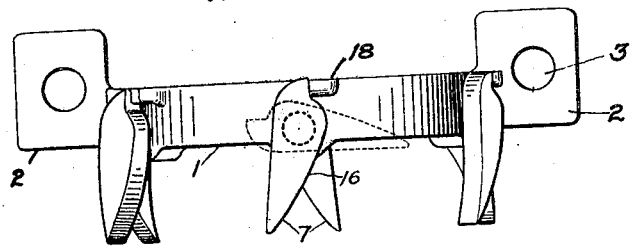
Figure 1 is an edge plan, or top view, of the ring and fingers.
Figure 2:
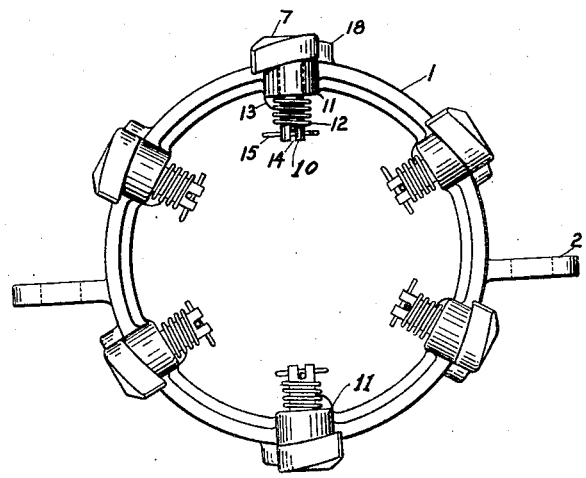
Figure 2 is a face view or elevation of the same, at right angles to Figure 1.
Figure 4:
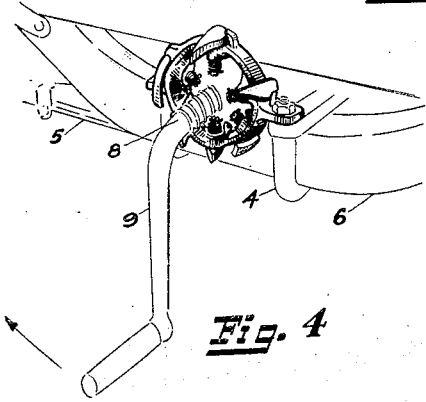
Figure 4 is a perspective view of a portion of the front of a Ford automobile, with my invention applied thereto.

Referring to the figures;—The ring 1 is provided with ears 2, which are pierced as at 3, to receive the U-bolts 4 which clip the spring 5 and front member 6 of the automobile. Mounted on the ring 1 are a number of fingers 7, projecting in an axial direction. The ring and the circle of fingers thus encircle the crank stem 8, and the crank arm 9 as the crank revolves, contacts each of the fingers in turn, the ring and the fingers being made of a size to ensure that result.

Figure 3:
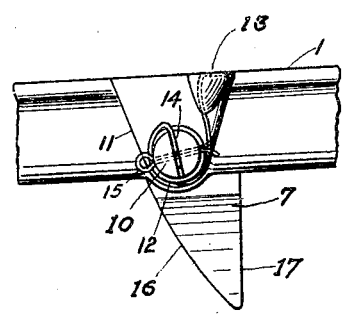
Figure 3 is a fragment of the ring with the lowermost finger of Figure 2, shown on a larger scale than Figures 1 and 2.

Each finger is provided with a lateral stem 10, which enters a hole through the ring and a boss 11 thereon, and thus pivots the finger. Encircling the inner end of stem 10 is a coil spring 12, one end of which engages a lug 13 on the ring, and the other end engages in a groove 14 in the end of the stem, and is maintained therein by a split pin 15. The fingers are thus spring-held in the positions shown in full lines in Figures 1 and 3, but are capable of being forced into the position shown in dotted lines in Figure 1. The back of each finger is sloped to a degree 16, such that the crank arm in any backward movement will strike that slope and slide toward the end of the finger and off.

In the operation of cranking, the crank arm contacts each front face 17 of each finger in turn, and presses the finger out of the way, as indicated by the dotted position in Figure 1 of the uppermost finger. As the crank passes the finger the latter springs back to the full-line position, and against a stop 18, which retains it in that position. Should the crank reverse its direction of movement, under a back-fire, or any other force, the finger held by the stop will be unyielding, and the crank arm will then ride up the inclined face 16, disconnecting the crank from the crank-shaft, not shown.

I make the fingers as many in number, as is feasible without their interfering, thereby reducing the backlash motion to a minimum, and I have found six fingers to be the ideal number for use on a Ford car. With less than this number the backlash is dangerous, so much so, that the device is of little or no value for the prevention of injury in the act of cranking.

I claim:—

1. An automobile starting-crank safety device, consisting of a ring having fingers pivotally mounted thereon at equally spaced distances, the said fingers adapted to yieldingly engage the crank when the latter is moved in the cranking direction, but to present unyielding inclined faces to the same when moved in the reverse direction, the said inclined faces permitting the crank to ride thereover and off without injury to the operator, the said device adapted to slip over the crank carried by the automobile, and be operable only by direct engagement with the arm of the said crank.

2. An automobile starting-crank safety device, comprising a ring, means for securing said ring to the machine in a position to encircle the starting-crank carried by said machine, a series of fingers equally spaced and mounted circumferentially on said ring, a spring for each finger adapting it to yield in one direction, and a stop for each finger adapted to render it unyielding in the opposite direction from its normal position, the said device operable by direct engagement with the arm of the said crank.

3. A starting-crank safety device for automobiles, comprising a ring, ears on said ring adapting it for connection to the machine in a position concentric with the crank shaft, a circle of fingers equally spaced and pivotally mounted on said ring, a spring for each finger permitting it to yield in one direction and to return it to its normal position after such yielding, and a stop to render the finger unyielding in the opposite direction, the said device operable by direct engagement with the arm of the starting crank, the latter being the crank carried by the machine.

4. A starting-crank safety device for automobiles, comprising a single ring provided with means for connecting the device to the machine, said ring having a circle of six radial holes therein, a series of movable fingers each having a lateral stem adapted to enter and pivot in said holes, a coil spring encircling said stem of each finger, one end of the spring engaging the end of the movable stem, and the other end of the spring engaging a stationary lug on said ring, and a stop on the ring adapted to engage the finger and prevent its yielding in one direction, the said device operable by the arm of the starting crank contracting the said fingers.

BENJAMIN FRANK.